United States Patent [19]

Lee et al.

[11] 3,825,414
[45] July 23, 1974

[54] UREA-AMMONIUM POLYPHOSPHATE PRODUCTION

[75] Inventors: Robert G. Lee, Florence; Robert D. Mitchell, Sheffield, both of Ala.

[73] Assignee: Tennesse Valley Authority, Muscle Shoals, Ala.

[22] Filed: Dec. 10, 1973

[21] Appl. No.: 423,419

Related U.S. Application Data

[63] Continuation-in-part of Ser. No. 202,836, Nov. 29, 1971, abandoned, which is a continuation-in-part of Ser. No. 130,236, April 1, 1971.

[52] U.S. Cl.......................................... 71/29, 71/34
[51] Int. Cl................................................ C05b 1/00
[58] Field of Search........................... 71/29, 34–36, 71/64 DA

[56] References Cited
UNITED STATES PATENTS 3,540,874   11/1970   Stinson.............................. 71/34 X
3,578,433   5/1971    Bottai et al........................... 71/29
3,585,020   6/1971    Legal et al............................ 71/29

Primary Examiner—Samih N. Zaharna
Assistant Examiner—Richard Barnes

[57] ABSTRACT

Pugmill granulation process for the production of fertilizers containing urea and ammonium polyphosphate. Concentrated urea solution is sprayed onto recycled solids in the pugmill followed by molten ammonium polyphosphate. The melt is fed to the pugmill at a minimum of 12 inches downstream from the urea to prevent hydrolysis of the urea which results in foaming and gas evolution. The product from the pugmill is essentially anhydrous, and no further drying is required. Other fertilizer materials such as ammonium sulfate, potassium chloride, or micronutrient sources may be incorporated by adding them to the pugmill during granulation.

1 Claim, 1 Drawing Figure

FLOWSHEET OF UREA-AMMONIUM POLYPHOSPHATE PILOT PLANT

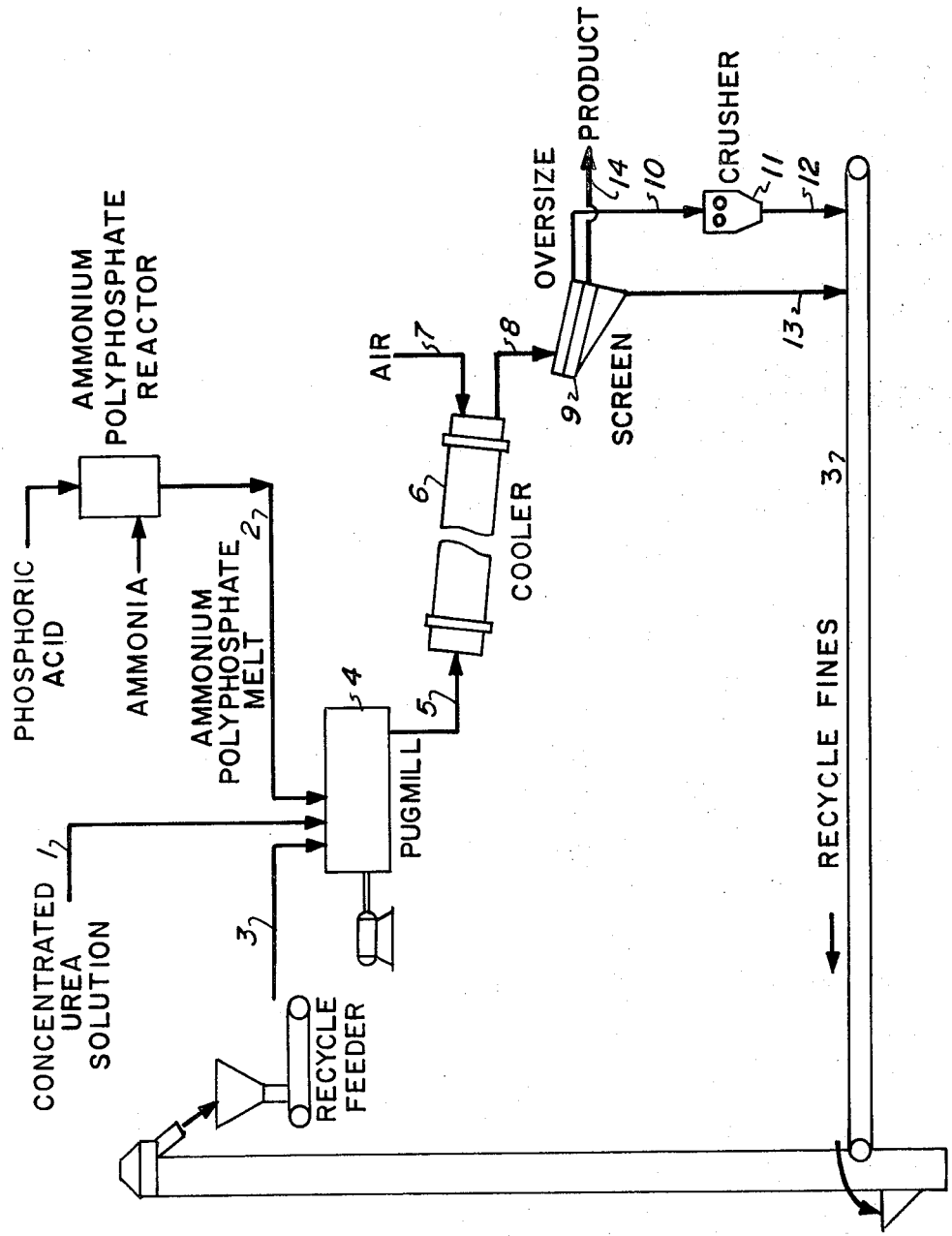
FLOWSHEET OF UREA-AMMONIUM POLYPHOSPHATE PILOT PLANT

UREA-AMMONIUM POLYPHOSPHATE PRODUCTION

This application is a continuation-in-part of our copending application Ser. No. 202,836, filed Nov. 29, 1971, now abandoned which, in turn, is a continuation-in-part of application Ser. No. 130,236, filed Apr. 1, 1971, now Defensive Publication T900,018, both for Urea-Ammonium Polyphosphate Production.

The invention herein described may be manufactured and used by or for the Government for governmental purposes without the payment to us of any royalty therefor.

Our invention relates to a newly developed process for the production of urea-ammonium polyphosphate granules, more particularly to the granulation of molten ammonium polyphosphate and concentrated urea solution in a pugmill or blunger type of granulator, still more particularly to the production of granular urea-ammonium polyphosphate wherein the resulting product is in a highly crystallized form eminently suited for either short-term or long-term storage, and even still more particularly to a newly developed process for the production of urea-ammonium polyphosphate in highly crystallized form by mechanically working a molten mixture of ammonium polyphosphate and urea by shearing action of the pugmill paddles to impart energy necessary to effect crystallization of ammonium polyphosphate from the melt phase. Alternately, the urea can be added to the pugmill in solid form, but addition of the urea as a concentrated solution is preferable because the solution is normally less costly to produce than the solid prills or granules.

Although urea-ammonium polyphosphate fertilizers lend themselves to a great variety of grades, many of which are higher in plant nutrient concentration than generally heretofore obtainable, it has been found that in order to obtain urea-ammonium polyphosphate fertilizer material in a form well suited for storage and handling as well as application, it is necessary to have the product in a highly crystallized form rather than in amorphous form, which amorphous form has poor handling and storage properties. Storage tests have shown that the products we have produced by our process have excellent storage and handling properties.

Heretofore, one way to make crystalline urea-ammonium polyphosphate is to add solid urea to molten ammonium polyphosphate and to oil prill the mixture. This process is described by Bottai and Stinson (U.S. Pat. No. 3,578,433 issued May 11, 1971). In order to obtain homogeneous prills it was necessary to combine and mix the urea and ammonium polyphosphate melts prior to prilling. This combination of melts worked fairly well when only thermal phosphoric acid was utilized. However, when wet-process acid or mixtures of wet-process acid and thermal acid were tested in a pilot plant, the impurities in the wet-process acid resulted in an increase in the rate of hydrolysis. This hydrolysis resulted in loss of ammonia and foaming of the solution and melt mixture. Said foaming is at times so severe that it will spill over the top of a rotating prilling cup and can impart dissolved gases into the product prills. This problem of hydrolysis was so severe that it was a major factor in influencing us to abandon the oil-prilling process in our planning for a production unit and causing us to search for a better process.

Work on our invention was initiated and inspired by an urgent need to develop a satisfactory commercial process for producing a urea-ammonium polyphosphate product in granular or prilled form. We had intended to scale up into a full-size plant the process described by Bottai and Stinson, supra for production of urea-ammonium polyphosphate by oil prilling. However, subsequent pilot-plant work on a larger scale revealed that the Bottai et al process could not be satisfactorily utilized for the specific purposes intended for our plant operations.

The major problems we encountered in attempting to scale up the teachings of Bottai et al was severe and uncontrollable hydrolysis of urea when the urea and ammonium polyphosphate were mixed in their prilling cup. Bottai et al did their work primarily with thermal acid which is of high purity but which has now become too costly to use for fertilizer production. When we later tested their oil prilling process with wet-process phosphoric acid, which is the type acid that is normally used for commercial fertilizer production, the impurities in the acid catalyzed the hydrolysis of urea.

We also found that satisfactory centrifuging of the oil-prilled product to reduce the oil content to a reasonably low level would require centrifuging equipment too large to be practical. We further realized that the capability for mechanical working, such as is afforded by a pugmill, is desirable if the plant is to be capable of producing a wide variety of urea and ammonium polyphosphate combinations.

Therefore, we began a search for a more satisfactory process that we could scale up to a full-size plant. This led to our invention of a new urea-ammonium polyphosphate process as described herein. Our new process will be used, rather than the Bottai process, for our production-size unit which is now under construction and is expected to be on stream by about Nov. 1, 1973.

In our initial work with a pugmill we attempted to combine the urea and ammonium polyphosphate melts in a trough which discharged onto recycle in the pugmill. Again, hydrolysis was so severe that we had to abandon any mixing of these streams and we resolved to feed the two streams separately into the pugmill. We then found that the points of addition of molten ammonium polyphosphate and urea to the pugmill can be so separated that the hydrolysis reaction between the hot ammonium polyphosphate melt and urea will not occur. Specifically, we found that spraying the hot urea solution onto recycle fines at a point separated by at least about 12 inches from the molten ammonium polyphosphate prevented hydrolysis. We consider that this is due to allowing some cooling of one of the feed materials in the pugmill before it contacts the other feed material. Such cooling prevents hydrolysis, which is promoted by high temperature.

We have developed a new process for the production of urea-ammonium polyphosphate material wherein the problems relating to decomposition and hydrolysis of urea that occur in the oil-prilling process are avoided. We have also avoided the costly and difficult problems of separating oil from prilled products. This separation is normally made in a centrifuge, but large centrifuges for handling large rates of fertilizer production are not available, and the use of many small centrifuge units or centrifuges in parallel operation would be required for a commercial oil-prilling UAP process. Obviously, use of many small units in this way is highly objectionable. This problem with centrifuging of oil was another reason why we abandoned our oil-prilling process in favor of the pugmill granulation process for our production-scale plant. A survey of the literature has revealed no patents pertaining to pugmill granulation of urea and molten ammonium polyphosphate. Bottai and Stinson, supra, mention the probable requirement for mechanical working to apply energy of shear to satisfactorily granulate urea and ammonium polyphosphate melt.

In our early work, we found that when urea and ammonium polyphosphate melt were added at or very near the same point in the pugmill, severe hydrolysis reaction occurred, characterized by foaming and evolution of gases. We then added the urea at a point downstream from the point of entry of melt into the pugmill. Adding the urea downstream from the molten ammonium polyphosphate prevented hydrolysis of urea, but the urea which was coated onto the outside of the particles dusted off and was largely lost during processing. In later tests, the urea solution was sprayed onto the recycle material at or near the point of entry to the pugmill and the ammonium polyphosphate was added at a point (or points) substantially downstream and at least 12 inches from the point of urea entry. The ammonium polyphosphate melt overcoated the outside of the urea and protected the urea from abrasive action, thereby preventing the dusting off of urea. This method of positioning the feeds relative to each other in the pugmill was entirely satisfactory and prevented both chemical decomposition (hydrolysis) of the urea feed and loss of urea due to dusting off the granule surfaces.

By way of example of the effectiveness of the adding of the urea upstream of the melt in the pugmill in decreasing the dustiness of the product, pilot-plant data are given. The operating conditions for two pilot-plant tests for production of 28-28-0 grade urea-ammonium polyphosphate were essentially identical, except that the urea was added downstream from the ammonium polyphosphate melt in test 142 and upstream from the melt in test 149. Results from these tests, tabulated below, illustrate the extreme urea dust formation when urea was added downstream from melt and the deleterious effect on product grade.

erage of results, particularly in the amount of urea feed as dust that we have observed in the rest of our testing procedures. From the tests we made in the pilot plant we are more than 95 percent confident that if, for example, a hundred such tests were made and listed as the two above for each condition, i.e., downstream and upstream from the melt, the average urea feed recovered as dust would be right at about 25 percent, wherein the urea was fed downstream from the melt and right at about 2 percent urea feed recovered as dust in the instances wherein the urea was fed upstream from the melt, it being understood, of course, that the relationship of the two feed streams be spaced at least about 12 inches apart. For further purposes of illustration, the width of the pugmill used in these tests is 22 inches and the length about five feet and the streams of feed were directed onto the material covering the bottom of the pugmill in the general perpendicular attitude to the bottom surface of the pugmill about half way between the peripheral edges thereof, i.e., about 11 inches inward from the inner wall surface of the rim of said pugmill. The urea entered the pugmill at the upper end at or very near the point of entry of the recycle, with the melt being fed at a point about 12 inches downstream from the point of urea entry.

It seems obvious from these data for 28-28-0 grade product that dusting off of urea from the pugmill product would increase when making a product containing a higher proportion of urea than 28-28-0, and less urea would dust off when making a product containing a smaller proportion of urea than in 28-28-0. However, other factors affect dusting off of urea. The polyphosphate content of the APP melt affects dusting off of urea because the stickiness of the melt, and thus the binding properties, are directly proportional to its polyphosphate content. The recycle ratio, i.e., pounds of recycle per pound of product, used in the pugmill also affects dusting off of urea because it affects the particle size distribution of the material in the pugmill. In subsequent work, to minimize dustiness we ran tests of the production of 28-28-0 and 34-17-0 grades with the urea fed upstream from the APP melt. In these tests, the percentage of urea feed lost as dust ranged from about 3 percent (at the highest polyphosphate level

| Test No. | Location of urea feed entry | Chemical analysis, wt. % | | | | Urea feed as dust, |
|---|---|---|---|---|---|---|
| | | Screen product | | Cyclone dust | | |
| | | Total N | Total $P_2O_5$ | Total N | Total $P_2O_5$ | |
| 142 | Downstream from melt | 25.0 | 35.3 | 36.9 | 14.4 | About 25 |
| 149 | Upstream from melt | 28.2 | 28.3 | 9.3 | 12.4 | About 2 |

In test 142, with urea added after the melt, product grade was 25-35-0, illustrating the severe loss of urea, the nitrogen component. An excessive amount of dust was collected in the cyclone dust collectors. This dust was 37-14-0 grade, evidencing the high urea content.

In test 149, with urea sprayed onto recycle in the pugmill upstream from the point of melt entry, the product was exactly the 28-28-0 grade desired. Very little dust was collected in the cyclones, and analysis of the dust indicated that it contained no straight urea.

The above tests 142 and 149 were picked for purposes of illustration because they reflect the general avtested, 40 percent of the $P_2O_5$) up to about 13 percent for our highest urea grade product, to wit, 34-17-0. The average dust loss for both 28-28-0 and 34-17-0 grades was about 6 percent. Comparing the results of these tests with those shown in our parent application wherein the urea feed percent as dust when location of the urea entry was downstream from the urea melt shows a decrease in the amount of urea dusted off ranging from 500 percent to greater than 800 percent. It should, of course, be understood that this unprecedented and drastic reduction in the severe loss of urea is reported on the conservative side since it is compared with the urea feed percent as dust compared on the urea being downstream from the melt on a 28-28-0 grade. Still other tests wherein a direct comparison for each of the grades throughout our range was desired with the entry of the urea compared as downstream as against upstream observations and extrapolations indicated that in all situations the proper location of the urea feed, i.e., it being at least 12 inches upstream from the urea melt entry, could be expected to result in about a tenfold improvement in reducing the heretofore observed loss of urea as measured by the urea feed percent as dust collected.

To the unenlightened, it would at first seem obvious that to avoid the problem of reaction of the urea with the APP melt, one would feed the melt first, thereby cooling it with the recycle and feeding the urea solution downstream from the melt, but this results in the problem of dusting off of urea as discussed above. We therefore found it necessary to feed the urea upstream and the hot APP melt onto the mixture of urea and recycle and it was in this arrangement wherein we discovered the unusual and unexpected result of no reaction between the hot APP melt and urea. Examples of this lack of reaction are given in tables I-A and II-A below showing 18 percent of $P_2O_5$ as polyphosphate in the APP melt and the same 18 percent in the screened product for the 28-28-0 grade in test 207. Also, practically no reaction occurred in test 209 having 33 percent of the $P_2O_5$ as polyphosphate in the APP melt and 34 percent as polyphosphate in the screened 19-19-19 grade product.

TABLE I-A

Operation of Reaction System

| Test No. | 207 | 209 |
|---|---|---|
| Product (melt) rate, lb/hr. | 500 | 500 |
| Feed acid | | |
| Temp., °F | 140 | 270 |
| $P_2O_5$, percent | 50.7 | 51.0 |
| Scrubber | | |
| Temp., °F | 263 | 290 |
| pH (10% soln) | 1.9 | 1.8 |
| Temp., °F | | |
| Ammonia | 260 | 320 |
| Tee reactor | 410 | 432 |
| Ammonium phosphate melt | | |
| pH (10% soln) | 5.2 | 4.7 |
| Wt. percent | | |
| N | 13.4 | 13.0 |
| $P_2O_5$ | 55.4 | 56.6 |
| Percent of total $P_2O_5$ | | |
| Polyphosphate | 18 | 33 |
| Water soluble | 98 | 98 |
| Available | 100 | 99.8 |
| Degree of ammonification, lb. $NH_3$/unit of $P_2O_5$ | 5.9 | 5.6 |

TABLE II-A

Pilot-Plant Granulation of Ammonium Phosphate Melt

| | Product grade | |
|---|---|---|
| | 28-28-0 | 19-19-19 |
| Test No. | 207 | 209-2 |
| Test length, hr. | 5.0 | 4.5 |
| Product rate, lb/hr. | 1000 | 1480 |
| Feed acid | | |
| $P_2O_5$, percent | 50.7 | 51.0 |
| Temp., °F | 140 | 270 |
| Rate, lb./hr. | | |
| Melt | 500 | 500 |
| Urea | 500[1] | 500[1] |
| Potassium chloride | — | 480 |
| Ammonium nitrate (97% soln.) | — | — |
| Ammonium sulfate (crystalline) | — | — |
| Recycle | | |
| Ratio | 3.9 | 3.0 |
| Rate, lb./hr. | 3900 | 4400 |
| Temp., °F | 104 | 122 |
| Screen analysis, % by wt. | | |
| +6 mesh | 2 | 2 |
| −6 +10 mesh | 27 | 24 |
| −10 mesh | 71 | 74 |
| Pugmill slope, in./ft. | 0.2 | 0.2 |
| Pugmill product | | |
| Temp., °F | 186 | 176 |
| Screen analysis, wt.% | | |
| +6 mesh | 29 | 26 |
| −6 +10 mesh | 31 | 30 |
| −10 mesh | 40 | 44 |
| Analysis of screened product (−6 +9 mesh), wt.% | | |
| N | 28.1 | 20.1 |
| $P_2O_5$ | 30.6 | 19.4 |
| $K_2O$ | — | 19.1 |
| $H_2O$ | 0.6 | 0.5 |
| Percent of total $P_2O_5$ | | |
| Polyphosphate | 18 | 34 |
| Water soluble | 98 | 98 |
| Available | 100 | 100 |

[1] Urea solution, 99%, 280°F.

It has been suggested by some that the rate at which the constituents pass through the pugmill relates to the time the recycle fines can cool the urea before admixture with the polyphosphate. We have looked into this aspect and have determined the residence time of the material in the pugmill as it travels from the point of entry of said urea to the point of entry of the polyphosphate melt some 12 inches downstream therefrom. We have determined that this residence time ranges from about one minute to about 7 minutes. For instance, the retention time in minutes is the volume of the pugmill in cubic feet divided by the throughput in cubic feet per minute. The volume of the pugmill is 19 cubic feet. The bulk density of the material averages 47.5 pounds per cubic foot. To arrive at throughput, any of the examples in our specification may be turned to. For example, table III infra with the wet-process material 28-28-0 shows feed rates of the melt and urea of 500 pounds per hour and that the recycle solids is 5800 pounds per hour, which totals 6800 pounds per hour throughput with a recycle ratio of 5.8. Sixty-eight hundred pounds per hour divided by 47.5 pounds per cubic foot equals 143 cubic feet per hour divided by 60 equals 2.38 cubic feet per minute. Plugging into the formula above for retention time, the volume divided by the throughout equals 19 divided by 2.38 equals 8 minutes. From table A, it may be seen (bottom line thereof) that the recycle ratio ranges from 0.5 to 10. Thus, $x$ divided by 8 equals 5.8 + 1.0[1] divided by 0.5 + 1.0[1] equals 35 minutes maximum retention time and 5.8 divided by 10 + 1 equals $x$ divided by 8 equals about 5 minutes minimum retention time, these retention times of about 5 minutes to about 35 minutes being over the total effective length of 5 feet of the pugmill, thereby yielding a range of retention times for the 12 inches of separation between the points of entry of urea and ammonium polyphosphate from about 1 minute to about 7 minutes.

Throughout equals pounds per hour recycle (5800) plus pounds per hour product (500 melt plus 500 urea).

We have found that our process has no limitations with regards to proportions of urea and ammonium polyphosphate melts that can be utilized. Products ranging from about 100 percent urea to about 100 percent crystallized ammonium polyphosphate melts can be granulated, whereas Bottai et al; supra, were limited to oil prilling of products with a proportion of urea to ammonium polyphosphate in the range from about 85:15 to about 25:75.

It is therefore an object of the present invention to produce granules of highly crystallized urea-ammonium polyphosphate which are in phase equilibrium and which therefore have excellent handling and storage properties.

Another object of the present invention is to produce granules of highly crystallized urea-ammonium polyphosphate which are in phase equilibrium and which therefore have excellent handling and storage properties by a process wherein the less expensive liquid form of urea may be utilized rather than the more expensive solid form of urea.

Still another object of the present invention is to produce granules of highly crystallized urea-ammonium polyphosphate which are in phase equilibrium and which therefore have excellent handling and storage properties by a process wherein the less expensive liquid form of urea may be utilized rather than the more expensive solid form of urea, and wherein the previous difficulties of hydrolysis and decomposition of urea that occur when said urea is mixed directly with ammonium polyphosphate melt, as is done in the oil-prilling operation, are avoided, and dusting of urea from the product is prevented.

A further object of the present invention is to produce granules of highly crystallized urea-ammonium polyphosphate which are in phase equilibrium and which therefore have excellent handling and storage properties by a process wherein the less expensive liquid form of urea may be utilized rather than the more expensive solid form of urea, wherein the previous requirement for centrifuges for separating oil from oil-prilled products is avoided, this being especially advantageous in large, commercial-scale operations in which a multiplicity of centrifuges in parallel operation would be required, whereas our invention requires but a single line of equipment.

Still another object of the present invention is to produce granules of highly crystallized urea-ammonium polyphosphate wherein the previous limitations of proportions of urea to ammonium polyphosphate melt are avoided because by our invention products ranging from about almost all urea to about almost all ammonium polyphosphate can be produced.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the true spirit and scope of the present invention.

Our invention, together with further objects and advantages thereof will be better understood from a consideration of the following description taken in connection with the accompanying drawing in which:

The FIGURE is a flowsheet generally illustrating the principles of our new and novel process which results in the unique urea-ammonium polyphosphate granules having the novel properties mentioned above.

Referring now more specifically to the FIGURE, streams of concentrated urea solution 1 (produced in equipment not shown but well known to those skilled in the art) and ammonium polyphosphate melt 2 are continuously fed with recirculating load of undersize product granules 3 into pugmill granulator 4 which imparts a tumbling, kneading, and mixing action to the feed materials, the location of the urea inlet being upstream from, and separated by a minimum of 12 inches from the location of the melt inlet. Granulator discharge stream 5 is withdrawn and fed to cooler 6, typically a rotating-kiln-type cooler where the hot granules are contacted with air stream 7 to cool the granules, thus removing the heat imported to the granules by the streams of urea 1 and ammonium polyphosphate 2. The stream of cooled granules 8 is then passed to size classifier 9, typically a set of vibrating screens which separates the stream into an oversize fraction, a product fraction, and an undersize fraction. The stream of oversize granules 10 is fed to crusher 11; the crushed oversize materials 12 are combined with the undersize stream 13, and the resulting stream 3 is recycled to granulator 4. The product-size stream 14 is collected as product.

The phosphoric acid used in our process may be of either the electric-furnace type or the wet-process type, or any mixture thereof, and a wide variety of acid concentrations may be used. The main objective of our process is to produce ammonium polyphosphate melt containing from about 1 percent to about 98 percent of its $P_2O_5$ as polyphosphates. Acid of merchant-grade concentration (50–58 percent $P_2O_5$ with wet-process orthophosphoric acid and 50–69 percent $P_2O_5$ with electric-furnace orthophosphoric acid) may be ammoniated by the process shown in U.S. Pat. No. 3,382,059, Getsinger, dated May 7, 1968, assigned to the assignee of the present invention. Also, acids in the superphosphoric acid range (68–70 percent $P_2O_5$ with wet-process acid, and 72–85 percent $P_2O_5$ with electric-furnace acid) may be ammoniated in a closed vessel at atmospheric or elevated pressures according to Hignett et al, U.S. Pat. No. 3,336,127 and the parent patents thereof. Either freshly prepared ammonium polyphosphate melt or ammonium polyphosphate solid may be utilized.

As has been discussed earlier, one of the objects of our process is to provide a means of producing an ammonium polyphosphate-containing product. Electric-furnace superphosphoric acid of 85 percent $P_2O_5$, which is about the maximum concentration of superphosphoric acid taught possible (see The Canadian Journal of Chemistry, volume 34, 1956, page 790), contains about 98 percent of its $P_2O_5$ as polyphosphates. Wet-process superphosphoric acid of about 79 percent $P_2O_5$ content would, depending upon congeneric impurity contents, contain a similar proportion of its $P_2O_5$ polyphosphates. Gestinger teaches that melts containing ammonium polyphosphates can be produced directly from reacting ammonia and wet-process phosphoric acid.

Urea solutions of 95 percent or greater concentration are preferred in our process. This is in contrast with the 70–85 percent urea solution preferred by R. D. Mitchell et al in U.S. Pat. application Ser. No. 649,750, filed June 28, 1967, assigned to an assignee of the present invention and now abandoned. However, solutions of somewhat lower concentrations may be utilized if, and only if, a dryer is installed in the process. However, since the dryer greatly increases the initial capital investment and production cost, we prefer that our urea solutions contain at least 95 percent urea by weight. It should also perhaps be pointed out that solid urea may be used in our process if one desires to pay the considerably higher and premium cost therefor and if the ammonium polyphosphate is applied as a hot melt. However, the great advantages of our process are more fully realized when urea solutions of at least 95 percent concentration are employed. Alternatively, it is possible to utilize solid ammonium polyphosphate with the urea solution.

While our invention relates primarily to the granulation of urea and ammonium polyphosphate melt, other nitrogen fertilizers such as ammonium nitrate or ammonium sulfate can easily be used instead of urea and have been successfully tested in pilot plant tests.

Following are pertinent points discovered in our work:

1. Separating the point of entry of the urea solution and the melt into the pugmill by at least 12 inches prevented their direct contact and avoided urea hydrolysis which results in foaming and gas evolution.

2. Spraying the urea solution into the granulator at a location upstream from the point of entry of the ammonium polyphosphate melt allowed the melt to "overcoat" the urea, thereby preventing subsequent dusting of urea from the granule surfaces.

3. As the polyphosphate content of the molten ammonium polyphosphate is increased, the stickiness of the melt increases, and more mechanical action as shear is required to induce crystallization and subsequent granulation.

4. When wet-process phosphoric acid is utilized in production of the ammonium polyphosphate melt, more mechanical working is required for crystallization of the melt and a greater proportion of recycled fines is needed to control granule size and avoid "overgranulation," as compared with utilization of 100 percent thermal acid, i.e., electric-furnace acid.

5. When granulating products of 100 percent urea, the products tended to be somewhat undersized and dusty. The addition of some molten ammonium polyphosphate improves granulation characteristics.

6. Spraying the urea solution into the granulator through a spray nozzle and adding molten ammonium polyphosphate through a perforated pipe gave improved granulation with less formation of oversize materials as compared to adding these materials as single streams.

7. With urea solution concentrations greater than about 95 percent, no drying of the product is required. Elimination of the drying step substantially decreases investment and operating costs for production.

In order that those skilled in the art may better understand how the present invention can be practiced, the following examples of processes we have used in the production of granular urea-ammonium polyphosphate materials employing a pugmill granulation system therefore are given by way of illustration and not by way of limitation. It should also be noted that the following examples I–V follow closely the chronological order of development of our new and unique process, and we have incorporated therein substantial quantities of information in order that all those skilled in the art may be taught fully the results of our labor. Accordingly, before presenting these examples, we have outlined in Table A below the acceptable and preferred ranges of variables in our process which, when taken in conjunction with the FIGURE of our process, will enable practice thereof.

TABLE A

Production of Urea-Ammonium Polyphosphate by Prilling in Liquid Medium: Acceptable and Preferred Range of Variables

| Variables | Limits | Preferred |
|---|---|---|
| Ammonium polyphosphate[1] | | |
|   Polyphosphate content, % of total $P_2O_5$ | 1–98 | 10–65 |
|   Degree of ammoniation, lb. $NH_3$/unit of $P_2O_5$ | 2.5–9.5 | 4.5–7.5 |
|   Melt temperature, °F. | 270–600[1] | 300–450 |
| Urea solution[2] | | |
|   Concentration, % by wt. | 95–100 | 99–99.5 |
|   Temperature, °F. | 250–325 | 290–310 |
| Pugmill mixer | | |
|   Temperature, °F. | | |
|     Recycled fines | 70–180 | 100–150 |
|     Mill discharge | 130–250 | 160–230 |
|   Pounds of recycled fines: pound product | 0.5–10 | 2–6 |

[1] Solid ammonium polyphosphate may be used also with urea solution.
[2] Solid urea may be used also with ammonium polyphosphate melt.

The product from our process may be advantageously used in a variety of ways to prepare high-analysis liquid fertilizers, some of which methods are taught in Hignett et al. U.S. Pat. No. 3,336,127, and in Bottai et al., 3,578,433 supra.

EXAMPLE I

Granular crystallized ammonium polyphosphate product of the invention was produced in continuous operation under typical equilibrium feed rates, flows, and process conditions shown in table I below.

EXAMPLES II THROUGH V

Similar data for production of granular urea, and 30-30-0, 36-18-0, and 22-44-0 grades of urea ammonium polyphosphate are given in tables II, III, IV, and V, respectively, and shown below.

TABLE I

Production of Granular Ammonium Polyphosphate

| Type phosphoric acid | Thermal | Wet-Process |
|---|---|---|
| Product grade | 15-62-0 | 11-57-0 |
| Feed rates to pugmill (lb./hr.) | | |
|   Ammonium polyphosphate melt | 750 | 1000 |
|   Recycled solids | 2340 | 4700 |
| Temperature (°F.) | | |
|   Ammonium polyphosphate melt | 386 | 450 |
|   Recycled solids | 106 | 134 |
|   Pugmill effluent | 216 | 200 |
|   Cooler effluent | 140 | 163 |
| Composition (wt.%) | | |
|   Ammonium phosphate melt | | |
|     Nitrogen | 15.8 | 11.3 |
|     Total $P_2O_5$ | 62.1 | 58.3 |
|     Nonortho $P_2O_5$, % of total $P_2O_5$ | 58.0 | 38.1 |
|   Process product | | |
|     Nitrogen | 15.6 | 11.5 |
|     Total $P_2O_5$ | 61.5 | 56.9 |
|     Nonortho $P_2O_5$ (% of total) | 54.5 | 32.6 |
|     Water-soluble $P_2O_5$ (% of total) | 100 | 93.6 |
| Screen analysis (wt.%) | | |
|   Pugmill effluent | | |

TABLE I-Continued

Production of Granular Ammonium Polyphosphate

| Type phosphoric acid | Thermal | Wet-Process |
|---|---|---|
| +6 mesh | 17.1 | 15.3 |
| −6+10 mesh | 41.0 | 54.2 |
| −10 mesh | 41.9 | 30.5 |

TABLE II

Production of Granular Urea

| | |
|---|---|
| Feed rates to pugmill (lb./hr.) | |
| Urea solution | 968 |
| Recycled solids | 2700 |
| Temperature (°F.) | |
| Urea solution | 302 |
| Recycled solids | 107 |
| Pugmill effluent | 210 |
| Cooler effluent | 131 |
| Composition (wt.%) | |
| Urea solution | |
| Nitrogen | 46.1 |
| Water | 0.8 |
| Process product | |
| Nitrogen | 46.4 |
| Water | 0.2 |
| Screen analysis (wt. %) | |
| Pugmill effluent | |
| +6 mesh | 15.8 |
| −6 +10 mesh | 40.0 |
| −10 mesh | 44.2 |

TABLE III

Production of Urea-Ammonium Phosphate — 1:1:0 Ratio

| Type phosphoric acid | Electric furnace | Mixed[1] | Wet-Process |
|---|---|---|---|
| Nominal grade | 30-30-0 | 30-30-0 | 28-28-0 |
| Feed rates to pugmill (lb./hr.) | | | |
| Ammonium polyphosphate melt | 483 | 433 | 500 |
| Urea solution | 482 | 486 | 500 |
| Recycled solids | 5560 | 4340 | 5800 |
| Temperature (°F.) | | | |
| Ammonium polyphosphate melt | 389 | 392 | 395 |
| Urea solution | 298 | 295 | 273 |
| Recycled solids | 131 | 131 | 135 |
| Pugmill effluent | 180 | 187 | 175 |
| Cooler effluent | 144 | 141 | 144 |
| Composition (wt. %) | | | |
| Ammonium polyphosphate melt | | | |
| Nitrogen | 14.8 | 14.8 | 12.0 |
| Total $P_2O_5$ | 62.1 | 61.6 | 56.9 |
| Nonortho $P_2O_5$, % of total $P_2O_5$ | 48.4 | 50.9 | 20.9 |
| Urea solution | | | |
| Nitrogen | 46.0 | 45.9 | 46.0 |
| Process product | | | |
| Nitrogen | 30.4 | 30.1 | 27.4 |
| Total $P_2O_5$ | 31.0 | 31.7 | 31.7 |
| Water | 0.3 | 0.7 | 0.3 |
| Screen analysis (wt. %) | | | |
| Pugmill effluent | | | |
| +6 mesh | 2.3 | 8.4 | 10.4 |
| −6 +10 mesh | 63.4 | 44.5 | 32.3 |
| −10 mesh | 34.3 | 47.1 | 57.3 |

[1] Mixture of electric-furnace and wet-process acids (about 80 percent electric-furnace acid).

TABLE IV

Production of Urea-Ammonium Phosphate — 2:1:0 Ratio

| Type phosphoric acid | Electric furnace | Mixed[1] | Wet-process |
|---|---|---|---|
| Nominal grade | 36-18-0 | 36-18-0 | 34-17-0 |
| Feed rates to pugmill (lb./hr.) | | | |
| Urea solution | 960 | 1126 | 890 |
| Ammonium polyphosphate melt | 475 | 482 | 400 |
| Recycled solids | 5643 | 5520 | 6420 |
| Temperature (°F.) | | | |
| Ammonium polyphosphate melt | 391 | 392 | 421 |
| Urea solution | 300 | 305 | 305 |
| Recycled solids | 129 | 136 | 133 |
| Pugmill effluent | 193 | 198 | 177 |
| Cooler effluent | 152 | 155 | 141 |
| Composition (wt. %) | | | |
| Ammonium polyphosphate melt | | | |
| Nitrogen | 15.4 | 14.5 | 12.1 |
| Total $P_2O_5$ | 62.4 | 61.3 | 58.1 |
| Nonortho $P_2O_5$, % of total $P_2O_5$ | 59.3 | 42.7 | 34.0 |
| Urea solution | | | |
| Nitrogen | 46.3 | 46.1 | 46.1 |
| Process product | | | |
| Nitrogen | 35.9 | 35.6 | 34.7 |
| Total $P_2O_5$ | 20.9 | 20.3 | 20.0 |
| Water | 0.3 | 0.3 | 0.7 |
| Screen analysis (wt. %) | | | |
| Pugmill effluent | | | |
| +6 mesh | 11.1 | 11.0 | 6.6 |
| −6 +10 mesh | 20.3 | 37.1 | 24.4 |
| −10 mesh | 68.6 | 51.9 | 69.0 |

[1] Mixture of electric-furnace and wet-process acids (about 80 percent electric-furnace acid).

TABLE V

Production of Urea-Ammonium Phosphate — 1:2:0 Ratio

| Type phosphoric acid | Electric furnace | Mixed[1] | Wet-Process |
|---|---|---|---|
| Nominal grade | 22-44-0 | 22-44-0 | 21-42-0 |
| Feed rates to pugmill (lb./hr.) | | | |
| Urea solution | 282 | 266 | 265 |
| Ammonium polyphosphate melt | 707 | 703 | 750 |
| Recycled solids | 5190 | 6585 | 4120 |
| Temperature (°F.) | | | |
| Ammonium polyphosphate melt | 393 | 391 | 418 |
| Urea solution | 291 | 291 | 293 |
| Recycled solids | 138 | 131 | 128 |
| Pugmill effluent | 181 | 178 | 191 |
| Cooler effluent | 138 | 142 | 147 |
| Composition (wt. %) | | | |
| Ammonium polyphosphate melt | | | |
| Nitrogen | 14.6 | 14.4 | 11.8 |
| Total $P_2O_5$ | 62.4 | 61.0 | 57.6 |
| Nonortho $P_2O_5$, % of total $P_2O_5$ | 50.0 | 39.3 | 23.7 |
| Urea solution | | | |
| Nitrogen | 45.9 | — | — |
| Process product | | | |
| Nitrogen | 23.8 | 22.4 | 20.6 |
| Total $P_2O_5$ | 44.0 | 45.4 | 43.4 |
| Water | 0.5 | 0.6 | 0.4 |
| Screen analysis (wt. %) | | | |
| +6 mesh | 8.9 | 8.2 | 31.7 |
| −6 +10 mesh | 45.4 | 62.0 | 21.4 |
| −10 mesh | 35.7 | 29.8 | 46.9 |

[1] Mixture of electric-furnace and wet-process acids (about 80 percent electric-furnace acid).

While we have shown and described particular embodiments of our invention, modifications and variations thereof will occur to those skilled in the art. We wish it to be understood therefore that the appended claims are intended to cover such modifications and variations which are within the true scope and spirit of our invention.

We claim:

1. A process for the production of strong cyrstalline granular high-analysis urea-ammonium polyphosphates eminently suitable for fertilizer materials, which consists essentially of the steps of:
   1. simultaneously adding, at a temperature in the range from about 270° to about 600°F, a stream of molten ammonium polyphosphate containing from about 10 to about 65 percent of its $P_2O_5$ values as polyphosphate and, at a temperature of about 250° to about 325°F, a stream of concentrated urea solution, said urea solution ranging in concentration from about 95 to about 99.5 percent by weight and in proportions to one another such that the ratio of pounds of urea to pounds of ammonium polyphosphate is in the range from about 20:80 to about 80:20, into a pugmill mixer in the presence of later-mentioned recycled undersize in such a manner that the points of entry of the urea and ammonium polyphosphate melt streams are separated upstream from one another by at least 12 inches, with the urea stream being introduced upstream from the introduction of said molten ammonium polyphosphates, said manner of arranging said urea stream point of entry upstream by at least 12 inches from said ammonium polyphosphate melt point of entry substantially eliminating subsequent reaction of said urea with said ammonium polyphosphate;

2. maintaining the temperature of the material discharged from said pugmill in the range from about 130°F to about 250°F, and discharging therefrom the resulting solid urea ammonium polyphosphate mixture into cooling means; and 3. passing the resulting cooled mixture of urea and ammonium polyphosphate over screens to separate the oversize material and the undersize material from the product-size material; crushing said oversize material and combining with said undersize material for recycle to said step (1) supra at a recycle rate expressed as pounds of recycle fines:pound of product in the ratio of about 0.5 to about 10 and introduced into said pugmill in step (1) supra at a temperature in the range from about 70° to about 180°F.

* * * * *